Aug. 9, 1932.  O. HAPPEL  1,870,329
HOTHOUSE INSTALLATION
Filed March 6, 1930   3 Sheets-Sheet 2
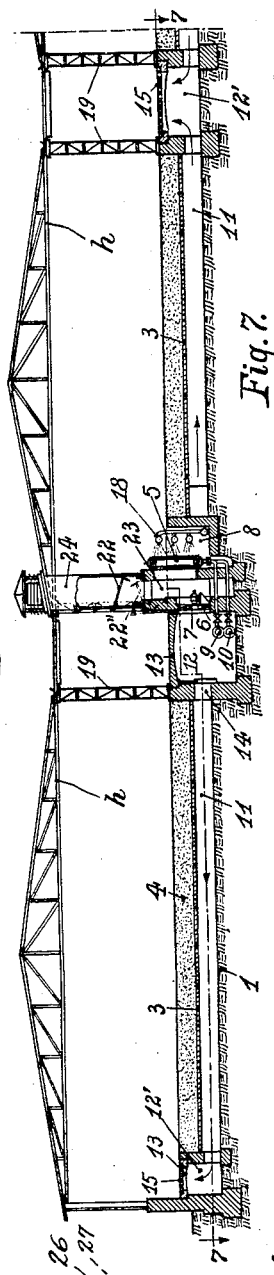
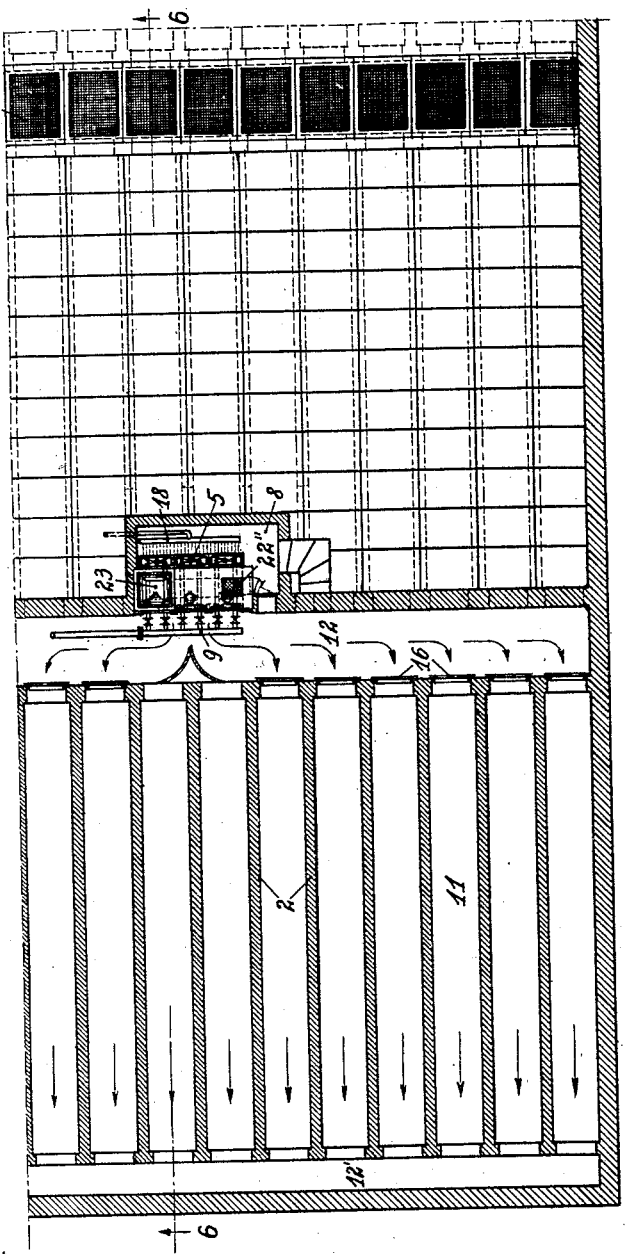
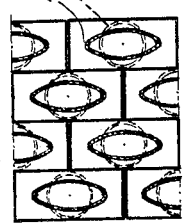
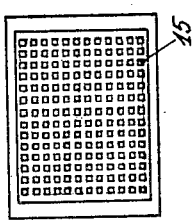
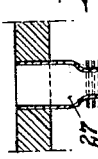
Inventor:
Otto Happel
Attorney.

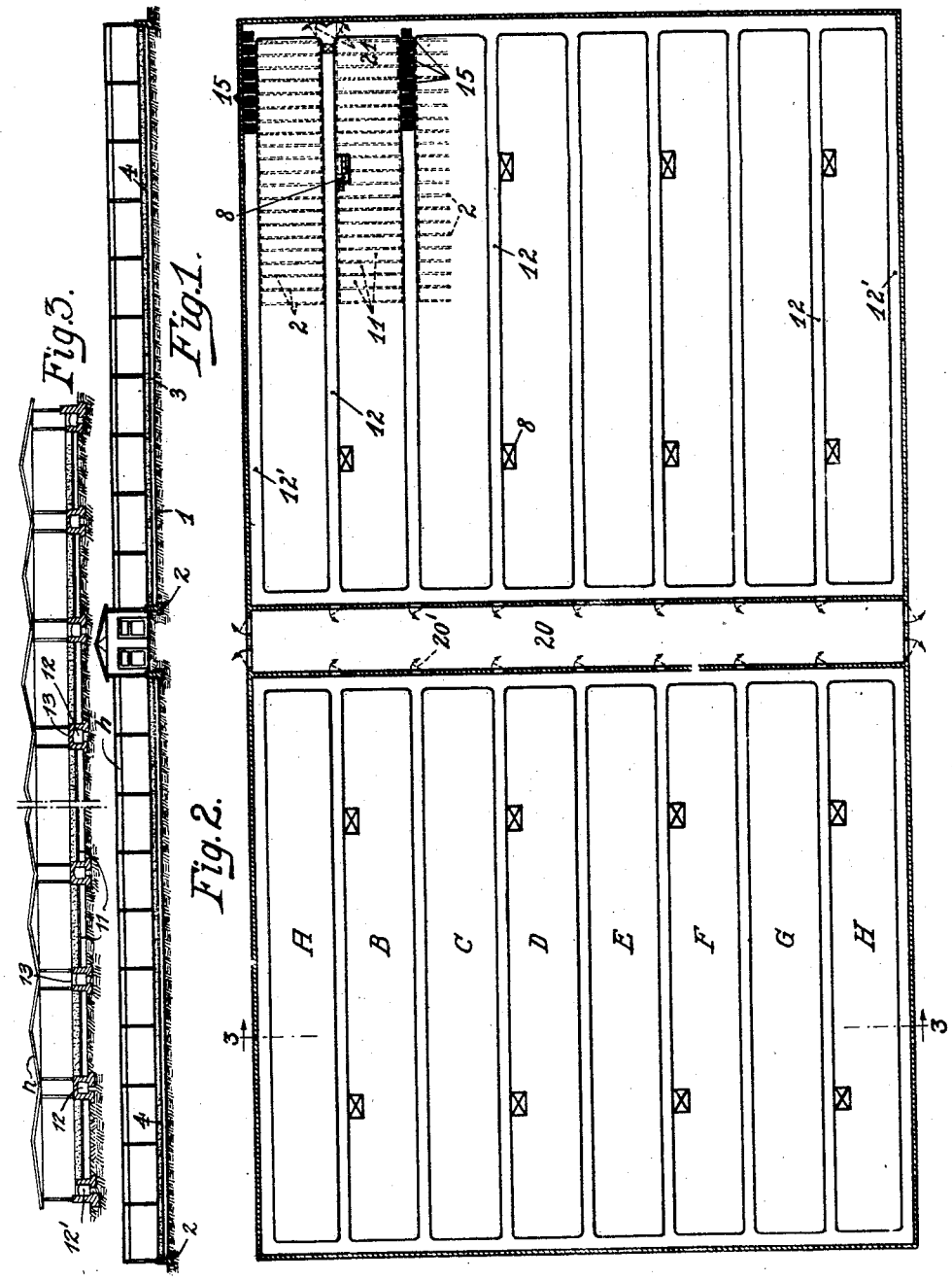

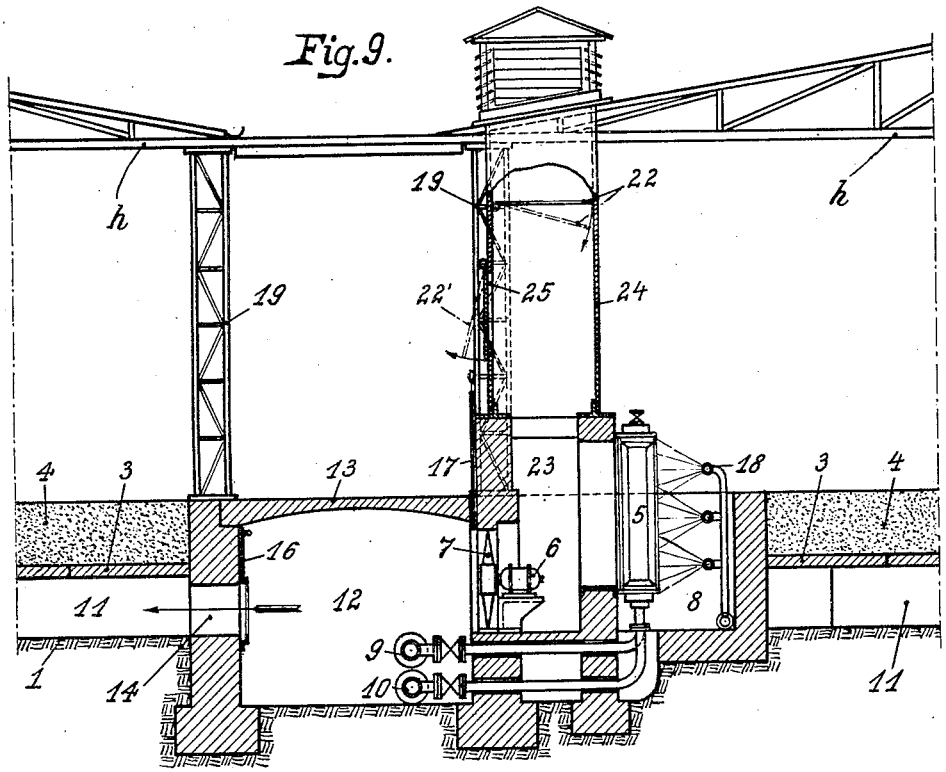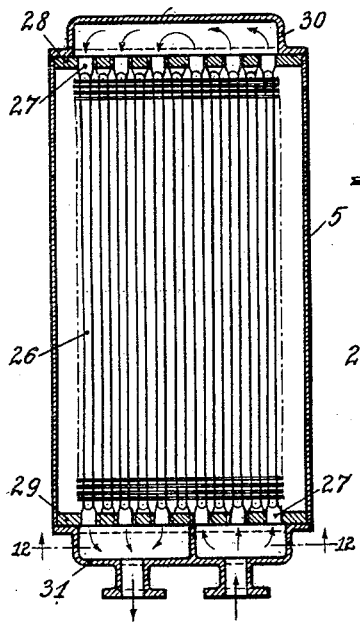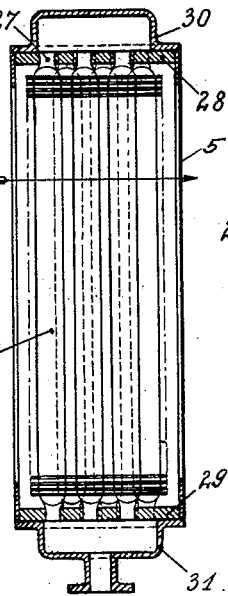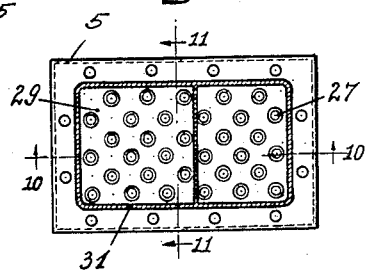

Patented Aug. 9, 1932

1,870,329

UNITED STATES PATENT OFFICE

OTTO HAPPEL, OF BOCHUM IN WESTPHALIA, GERMANY

HOTHOUSE INSTALLATION

Application filed March 6, 1930, Serial No. 433,688, and in Germany April 3, 1929.

The object of my present invention is to provide a system of hot-house heating, which is more economical than the hot-water systems commonly used and enables the available heat to be imparted more efficiently, and in a better regulated manner, to the atmosphere and soil of the hot-house. The system is applicable to plant-growing hot-houses of all kinds, but is of particular advantage for large hot-house installations laid out in connection with power-houses so that the heat derived from the condensers of steam engines can be used.

The most common method of heating hot-houses is by means of hot-water circulating by convection, or pumped, but with really large hot-houses this method is too expensive to be economically practicable. Another method consists in placing hot air or hot water pipes in the soil, but the transfer of heat from a metal pipe to soil is very inefficient, and very hot pipes are required, which involves risk of local over-heating. A method proposed for using the exhaust heat of steam engines consists in heating the hot-house by the moist, hot air derived from surface condensers sprayed with cooling water, the air being taken through pipes to the hot-house. This method is, of course, only available when a power-house is in proximity to the hot-house, and the installation is expensive. Moreover, the air to be heated by the condenser to, say, 30° or 40° C., may reach the condenser at a very low temperature in winter, whereas in summer, when the hot-house requires less heating, the condenser will be heating air already at a much higher temperature.

According to my invention air-heaters of a kind which is not in itself novel, having blowers which suck in and expel the air, are placed in the hot-house, and are operated so that the air is driven through the air-heaters with a comparatively high velocity, and then enters into cavities or chambers under the floor of the hot-house. These chambers possess openings at the top so that the issuing air first heats the soil and then passes into the atmosphere of the hot-house in order to be sucked back to the heaters. In this manner the air in the hot-house is kept in continuous circulation, a certain quantity of fresh air being, of course, admitted as required, the excess of air leaking out through existing crevices or through ventilating openings provided for the purpose.

Heaters of this kind, with blowers, have not hereto been used in hot-houses, but the circulation of air which they maintain is highly beneficial to the growth of many plants, probably because fresh supplies of air containing carbon dioxid are continuously brought into contact with the plants. As in summer it may be necessary to provide for an increased ventilation, a further object of my invention is to draw such fresh air from outside through suitable inlets, which open into the mixing-chamber arranged between the blower and the heater. This arrangement may also be of use when the air-heaters are in use for heating air, the inlets for fresh air being left open in order to mix cold air with the air heated by the heaters. The temperature of the heated air can in this manner be regulated within very wide limits. A regulated quantity of fresh air from outside can be added to the air from the hot-house passing into the heaters, or to the air which has already been heated by the heaters.

A good cooling effect is obtained in summer, if the heated air is first blown into the underground chambers hereinbefore referred to, as these are then fairly cool, particularly if they contain water which has trickled into them from the soil on top. The evaporation of this moisture substantially cools the air.

Apparatus according to the invention is shown by way of example in the accompanying drawings, in which:—

Figure 1 is a diagrammatic elevation of a hot-house.

Figure 2 is a similar plan view of said hot-house.

Figure 3 is a section taken on the line 3—3 of Fig. 2.

Figure 4 is a sectional view of a part of a ribbed heating-tube of one of the air-heaters.

Figure 5 is a plan view of a part of a nest of such tubes.

Figures 6 and 7 show a part of the hot-house to a larger scale than that of Figures 1 and 2; Figure 6 being a section taken on the line 6—6 of Figure 7, and Figure 7 being a section taken on the line 7—7 of Figure 6.

Figure 8 is a plan view of one of the grids.

Figure 9 is a sectional view of a heating chamber on a larger scale;

Figure 10 is a vertical sectional view of an air-heater taken on the line 10—10 of Figure 12.

Figure 11 is a similar vertical sectional view of said air-heater taken on the line 11—11 of Figure 12.

Figure 12 is a horizontal sectional view taken on the line 12—12 of Figure 10.

The hot-house shown may have an area of about 200,000 square meters, and is served for heating with the cooling water of a steam condensing apparatus.

The subsoil 1 is levelled and given a dressing of ash, and upon it are erected brick foundation walls 2, supporting a floor of ferroconcrete slabs 3, on which the soil 4 forming the plant-culture surface units is placed. The spaces between the walls, under the floor, form the heating channels or flues, the walls serving as guides of heat to the soil.

Figures 6, 7 and 9 show what may be called one of the air heating stations, with three heaters 5 arranged in parallel, each having an electromotor 6 driving an air propeller or blower 7, the apparatus being in a partly underground chamber 8 and having supply and discharge pipes 9 and 10 for the heating medium. The parallel heating channels, flues or transverse passages 11 shown in Figs. 2, 6, 7 and 9 communicate with distributing flues 12 arranged transversely thereto and similarly arranged collecting-flues 12', into which the chambers 8 open. These flues are arranged between the plant beds A, B, C etc., into which the cultivating area is divided, their roofs 13 forming paths or roads. Arrows indicate the flow of air in some of the figures, there being openings 14 through which hot air flows from the distributing-flues or air-distributing passages 12 into the chambers or connecting passages 11, whence it flows into the collecting-flues or passages or air-discharge passages 12'. In the roofs of the latter are grids 15 for discharging the air into the air-space of the hot-house, whence the air is sucked back to the heaters.

Each chamber 11 can be cut off, wholly or in part, from its supply-flue 12, by a damper 16. The blowers 7 can also be cut off separately by slides 17, so that regulation can be effected by putting selected blowers into or out of operation, as also regulating the effective air-heating area and the supply of air or of heating medium.

The slabs 3 are preferably porous or perforated so that some air can pass through them for heating and aerating the soil.

Sprayers 18 (Figs. 6, 7 and 9) spray water upon the heaters, which evaporate it and thereby moisten the air taken from the said heaters.

The structure of the hot-house $h$, above ground, is adapted to the particular requirements of the plants to be grown and with due regard to the method of cultivation in heated soil. The roof supports 19 may be disposed alongside the paths. As it is now usual in large hot-houses to use trucks and the like (sometimes electrically driven) for carrying manure, soil, implements and so on, concrete or like paths are more or less essential therein, so that the construction of the air channels, with roofs which constitute such paths, does not greatly increase the cost. It is frequently of advantage to have flat, sunk roof portions over the paths, on which attendants can walk for the purpose of cleaning and repairing the roof, these parts serving also for roof drainage. In said hot-house as illustrated there is a central main path 20 (Fig. 2), but of course there may be several such main paths if required. A damper 20' may be provided for each flue and communicating with the main path 20.

Fig. 2 shows an arrangement of dampers 21 enabling a regulated amount of heated air to be admitted directly into the atmosphere of the hot-house from the flues 12, when the dampers 16 are wholly or partly closed, so that the heating of the soil from below is wholly or partly interrupted.

In cases where the heating medium is at a comparatively high temperature, as for example when hot steam is used, it may be of advantage to add some air from the atmosphere of the house to the heated air directly after the latter leaves the heaters, and for this purpose openings with dampers 22 and 22' (Fig. 6) may be provided in the roofs of the chambers 8 into which the blowers suck air from the heaters.

The air-heater has between the heating elements 5 and the blowers 7 a mixing-chamber 23 communicating with an air-shaft 24. The admission of fresh air to the mixing-chamber 23 through the air-shaft 24 is controlled by the damper 22, which is shown at different levels in Fig. 9. This damper is usually nearly closed, so that only a small quantity of fresh air is added to the heated air. In addition, air from the hot-house may be admitted to the chamber 23. For this purpose Fig. 9 shows an opening 25 controlled by a damper 22' in the wall of the air shaft, below the damper 22, and Figs. 6 and 7 show a damper 22" controlling an opening in the roof of the chamber 8. These arrangements enable the air discharged by the blowers to be kept at a temperature suited to the plant growth, say 30° C., though the air may be heated to a much higher degree by the air-heaters.

Figs. 4 and 5 and 10, 11, 12 show portions of one of the air-heaters which may be used. This heater has a nest of ribbed, quincuncially disposed tubes 26 of elliptical cross-section except at the end portions 27, which are circular cylindrical and are fitted into tube-floors 28 and 29 of the end-chambers 30 and 31 respectively.

In hot weather the damper 22 may be more fully opened, so that the blowers serve largely or wholly for ventilation, the heaters being put partly or wholly out of operation. The renewal of air in the hot-house then prevents undue heating by the sun-rays which penetrate the roof. Partial stoppage of the heating effect of the heaters may be effected by means of a shutter or the like between the heaters and the chamber 23. The subsoil under the chambers forms a very good heat insulator, when once it has been raised to the temperature of the heated air, and there is practically no loss of heat to the earth, particularly as the streams of hot air passing through the chambers 11 flow mainly along the roofs thereof. A certain degree of temperature stabilization is thus effected in case the heating of the air-heaters fluctuates, as may be the case when they are served by the condensing apparatus of a power-house.

In applicant's copending application Serial No. 433,689, filed March 6, 1930, there is disclosed and claimed the specific steam power plant.

It will be understood that the heating chambers may be of any convenient shape, and that they may be spaced apart from each other.

It will likewise be understood that the air heating system according to the invention is also suitable for forcing beds.

The system of air heating, with underground hot air chambers and flues having heat conducting walls lends itself exceptionally well both to maintaining an even soil and air temperature over a large area, and to regulating this temperature within wide limits over the whole area or locally, as requred, and it has also the advantage of enabling the soil to be aerated very effectively and to be cultivated by the aid of a plow, a method out of question in the known smaller hot-houses, wherein the soil is arranged on raised benches of a width adapted to enable the attendants to cultivate it from both sides and to be heated by air-pipes passed beneath said benches.

By rationally associating a hot-house and heating system, designed as described, with a power house or power generating station, and using the waste-heat for heating the hot-house, very great economies can be effected, both in the working of the power station and the working of the hot-house, so that a substantial cheapening in the production of vegetables and other crops may be effected.

I claim:—

1. A hot-house provided with air heaters fed with a heating medium and consisting of ribbed pipes and one or more blowers cooperating with the heaters; connecting passages below the floor of the hot-house which conduct the heated air to air-discharge passages arranged beyond the plant-culture surface and below the floor of the hot-house and which are arranged upon at least two opposite sides of a plant-culture surface unit of the hot-house served by the air flow of the heater; a relatively large number of openings being distributed over the entire length of said air-discharge passages through which the hot air enters into the air space of the hot-house to flow back therefrom over the plant-cultures to the blower of the heater.

2. A hot-house provided with air heaters fed with a heating medium and consisting of ribbed pipes, one or more blowers cooperating with the heaters; air-discharge passages arranged beyond the plant-cultures upon at least two of the opposite sides of a plant-culture surface of the hot-house; a system of parallel-connected heating passages arranged below the plant-culture soil and fed with air from the heater, said passages conducting the hot air to the air-discharge passages; a relatively large number of openings being provided in the air-discharge passages, distributed over the entire length of the same, and through which the air enters into the air space of the hot-house, thence flowing back over the plant-cultures to the blower of the heater.

3. A hot-house provided with air heaters arranged in the hot-house and fed with a heating medium, and consisting of ribbed pipes; one or more blowers cooperating with the heaters; an air-distributing passage arranged beneath the floor of the hot-house and laterally of the air-heater, which takes up the hot air; parallel heating passages proceeding transversely from the air-distributing passage to both sides and extending beneath the plant-culture soil; air-discharge passages extending in parallel to the above noted air-distributing passages and opening thereinto, arranged upon both longitudinal sides of the plant culture surface unit served by the air flow of the heater; a relatively large number of openings being provided in said air-discharge passages and distributed throughout the length thereof, whereby the hot air enters into the hot-house air-space, thence flowing back over the plant-cultures to the blower.

4. A hot-house provided with air heaters, fed with a heating medium, and consisting of ribbed pipes; one or more blowers cooperating with the heaters, parallel longitudinal passages arranged beneath the floor to serve for the distribution and the discharge of the hot air, arranged beyond the plant-cultures at the longitudinal outer sides of the hot-house and said passages having roofs which serve as driveways and footpaths beneath the junction points of neighboring plant beds; transverse passages being provided, which are arranged perpendicularly to the longitudinal passages and leading from the air-distributing passages to the air-collecting passages and arranged below the plant-culture soil, openings being provided in the air-discharge passages and distributed throughout the entire length of said passages, through which the hot air enters into the air space of the hot-house whence it flows back in a transverse direction over the plant-cultures to the blower of the air heater.

5. A hot-house provided with air heaters fed with a heating medium and consisting of ribbed pipes; one or more blowers cooperating with the heaters; deep-lying chambers for receiving the air-heaters and the blowers, whereby said chambers are arranged laterally of longitudinally directed air-distributing passages arranged below the floor of a hot-house and in some cases below the meeting points of two adjacent plant beds, transverse passages being provided and directed perpendicularly to said air-distributing passages, located below the plant-culture soil, and opening into air-discharged passages, extending parallel to the distributing passages each defining a plant-culture surface unit at its longitudinal sides; a relatively large number of openings being arranged in the covering of said discharge passages and distributed throughout the entire length of the same, through which the hot air discharges into the air space of the hot-house and flows transversely, from both sides, over the plant-cultures to the blower of the air heater.

6. A hot-house including a plurality of air heaters provided with blowers and consisting of ribbed pipes arranged at suitable spacings laterally to a common air-distributing passage; low lying chambers for receiving the air-heater apparatus, arranged laterally of the air-distributing passage and arranged approximately in the center of the plant-culture surface; air-discharge passages extending parallel to the air-distributing passages which lie at the limit of the effective range of the blast of each heating apparatus; heating passages arranged transversely below the plant-culture soil, and which connect the said air-distributing passage with the air-discharge passages; a relatively large number of openings being arranged in the air-discharge passages and distributed throughout their entire length, through which the hot air enters into the air space of the hot-house, thence flowing back transversely over the plant-cultures to the blowers of the air heaters; and controlling elements at the points where the transverse passages open into the air-distributing passages for varying the cross sectional area of passage for the hot air.

In testimony whereof, I affix my signature.

OTTO HAPPEL.